United States Patent
Tsai

(10) Patent No.: US 7,465,103 B1
(45) Date of Patent: Dec. 16, 2008

(54) PLASTIC FIBER CABLE COUPLING STRUCTURE

(75) Inventor: Eden Tsai, Shulin (TW)

(73) Assignee: Comosss Electronic Co., Ltd., Taipei (TW)

(*) Notice: Subject to any disclaimer, the term of this patent is extended or adjusted under 35 U.S.C. 154(b) by 0 days.

(21) Appl. No.: 12/145,656

(22) Filed: Jun. 25, 2008

(51) Int. Cl.
*G02B 6/36* (2006.01)
*G02B 6/38* (2006.01)

(52) U.S. Cl. .......................... 385/53; 385/70
(58) Field of Classification Search ............... 385/70, 385/53
See application file for complete search history.

(56) References Cited

U.S. PATENT DOCUMENTS

| | | | | |
|---|---|---|---|---|
| 4,429,938 A * | 2/1984 | Flor | ........................ | 439/314 |
| 4,690,495 A * | 9/1987 | Giannini | ........................ | 385/57 |
| 4,822,130 A * | 4/1989 | Maranto et al. | ........................ | 385/138 |
| 5,015,061 A * | 5/1991 | Giannini | ........................ | 385/56 |
| 5,401,175 A * | 3/1995 | Guimond et al. | ........................ | 439/38 |
| 5,590,229 A * | 12/1996 | Goldman et al. | ........................ | 385/59 |
| 5,805,760 A * | 9/1998 | Serafini et al. | ........................ | 385/147 |
| 5,906,513 A * | 5/1999 | Peterson et al. | ........................ | 439/607 |
| 6,059,461 A * | 5/2000 | Aoki et al. | ........................ | 385/60 |
| 6,130,978 A * | 10/2000 | Limbert et al. | ........................ | 385/87 |
| 6,171,070 B1 * | 1/2001 | Mitake | ........................ | 417/273 |
| 6,179,479 B1 * | 1/2001 | Crivelli | ........................ | 385/73 |
| 6,196,553 B1 * | 3/2001 | Arab-Sadeghabadi et al. | ........................ | 277/603 |
| 6,222,127 B1 * | 4/2001 | Ykema | ........................ | 174/70 B |
| 6,305,849 B1 * | 10/2001 | Roehrs et al. | ........................ | 385/59 |
| 6,315,461 B1 * | 11/2001 | Cairns | ........................ | 385/56 |
| 6,346,014 B1 * | 2/2002 | Griesser et al. | ........................ | 439/680 |
| 6,641,310 B2 * | 11/2003 | Williams | ........................ | 385/92 |
| 7,040,909 B2 * | 5/2006 | Cairns | ........................ | 439/271 |
| 7,172,447 B2 * | 2/2007 | Allensworth et al. | ........................ | 439/271 |
| 2001/0012428 A1 * | 8/2001 | Nakajima et al. | ........................ | 385/78 |
| 2002/0031313 A1 * | 3/2002 | Williams | ........................ | 385/92 |
| 2002/0097964 A1 * | 7/2002 | Roehrs et al. | ........................ | 385/59 |
| 2004/0151464 A1 * | 8/2004 | Marrs | ........................ | 385/134 |
| 2005/0117854 A1 * | 6/2005 | Chiu et al. | ........................ | 385/92 |
| 2005/0136722 A1 * | 6/2005 | Cairns | ........................ | 439/271 |
| 2006/0013537 A1 * | 1/2006 | Miyake et al. | ........................ | 385/60 |
| 2008/0124031 A1 * | 5/2008 | Scadden et al. | ........................ | 385/75 |

* cited by examiner

*Primary Examiner*—K. Cyrus Kianni

(57) ABSTRACT

A plastic fiber cable coupling structure includes two symmetric coupling pieces coupling with each other. The coupling piece includes a male and a female kit, the male kit has a fixing block and a flange disposed at each side thereof, and two cone-shaped fiber channels disposed therein. Besides, the female kit has a connecting hole disposed at each side thereof, a fastening block disposed at each inner side thereof, and two fiber channels disposed therein, wherein a plurality of detent bodies extend outwardly from the inner side of a first fiber channel, a coupling hole is dug out on the outer side of the first fiber channel, a guiding face is formed on the inner side of a second fiber channel with a plurality of detent bodies extending outwardly, and a coupling end extends outwardly from the outer side of the second fiber channel with a guiding face formed inside the coupling end. Therefore, the coupling piece is constituted by inserting one end of the male kit into the female kit; finally, the plastic fiber cable coupling structure is formed by connecting the two symmetric coupling pieces and using a locking piece to combine the two coupling pieces into one unit.

4 Claims, 4 Drawing Sheets

PLASTIC FIBER CABLE COUPLING STRUCTURE

BACKGROUND OF THE INVENTION

1. Field of the Invention

The present invention relates to a plastic fiber cable coupling structure, and more particularly, to a plastic fiber cable coupling structure which lets two plastic fiber cables to couple with each other.

2. Description of the Prior Art

Presently there's been explosive demands of data communication and higher bandwidth, therefore, fiber optics has gradually become the main transmission medium of network communication since it has advantages such as low transmission loss, high bandwidth, non-conductivity, small bending diameter and light weight, etc.

Although fiber cables have been widely used in network communications, however, due to the limited installation lengths of fiber cables, it is necessary to couple two different fiber cables to extend the total cable length to reach the required installation position.

Since there are few techniques to couple two plastic fiber cables now, it is not easy to combine two plastic fiber cables into one unit. Furthermore, fiber fusing splicer is both complicated and expensive for mechanics to use it to operate on site.

Therefore, the traditional plastic fiber cable coupling techniques present several shortcomings to be overcome.

In view of the above-described deficiencies of the traditional plastic fiber cable coupling techniques, after years of constant effort in research, the inventor of this invention has consequently developed and proposed a plastic fiber cable coupling structure in the present invention.

SUMMARY OF THE INVENTION

It is an object of the present invention to provide a coupling method for couple two plastic fiber cables into one unit. This method facilitates easy and convenient installation and is not limited to specific environment or space during construction.

It is another object of the present invention to provide a plastic fiber cable coupling structure which is simple, easy to operate and inexpensive.

In order to achieve the above objects, the present invention provides a plastic fiber cable coupling structure, which mainly comprises: two symmetric coupling pieces coupling with each other; wherein the coupling piece comprises a male kit, which is the inlet for insertion of the plastic fiber cable, and the male kit has a fixing block and a flange disposed on each side thereof, and the male kit has two fiber channels both having small inner diameter and larger outer diameter. Besides, a female kit is provided for insertion of the male kit, and the female kit has a connecting hole disposed on each side thereof, and the female kit has a fastening block disposed on each inner side thereof. Furthermore, the female kit has a first and a second fiber channels disposed therein, wherein the fiber channel couples with the fiber channel of the male kit, the first fiber channel inside the female kit has a plurality of detent bodies extended outwardly from the inner side thereof and a coupling hole dug out on the outer side thereof. The second fiber channel has a guiding face formed on the inner side thereof, and the second fiber channel has a coupling end extended outwardly from the outer side thereof, while the coupling end also has a guiding face formed therein, therefore, the coupling piece is constituted by inserting one end of the male kit into the female kit. Finally, the plastic fiber cable coupling structure is formed by connecting the two symmetric coupling pieces and using a locking piece to combine the two coupling pieces into one unit.

These features and advantages of the present invention will be fully understood and appreciated from the following detailed description of the accompanying Drawings.

DETAILED DESCRIPTION OF THE PREFERRED EMBODIMENT

Figure 1:
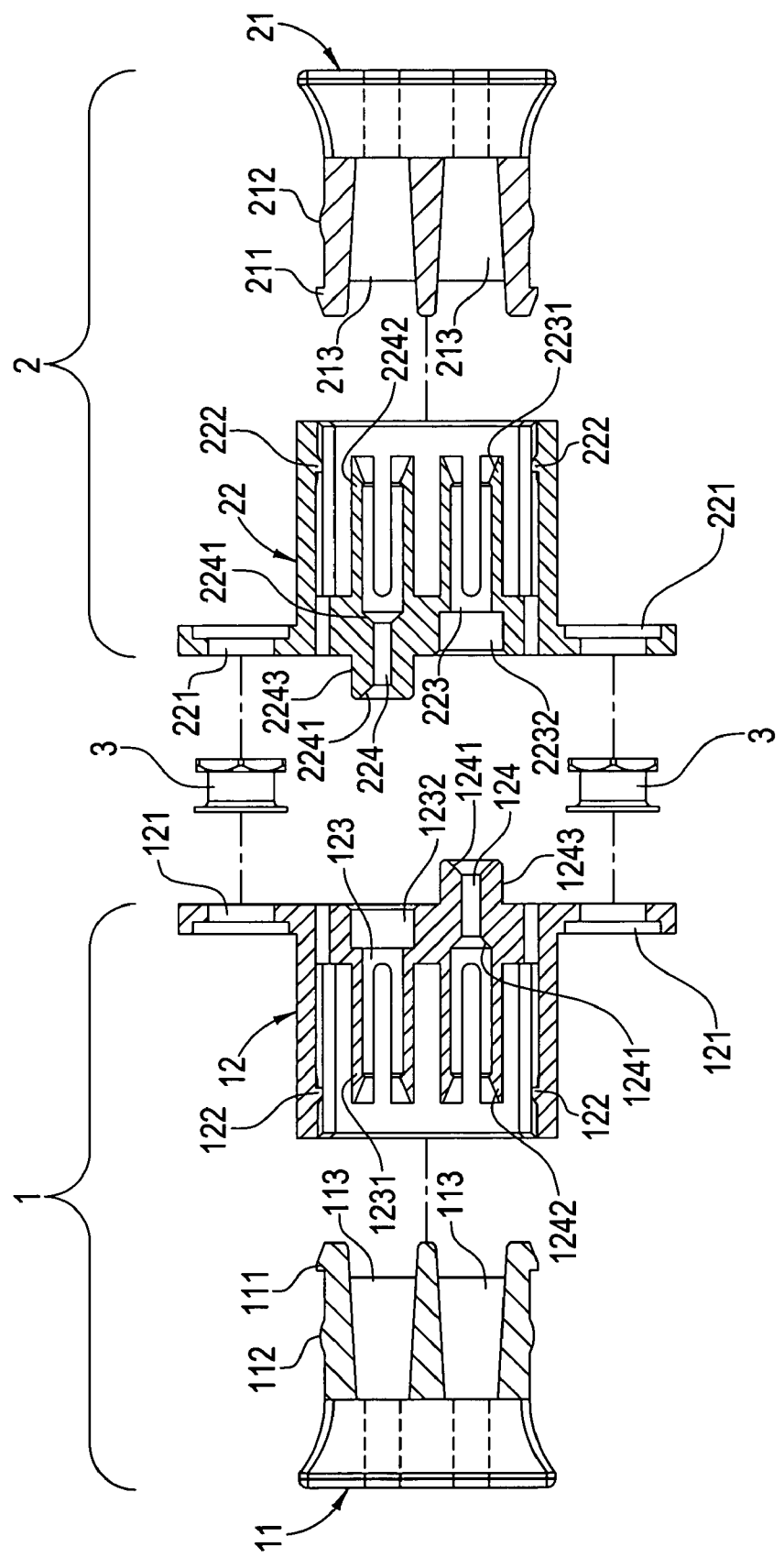
FIG. 1 illustrates a perspective view of a plastic fiber cable coupling structure.
Figure 2:
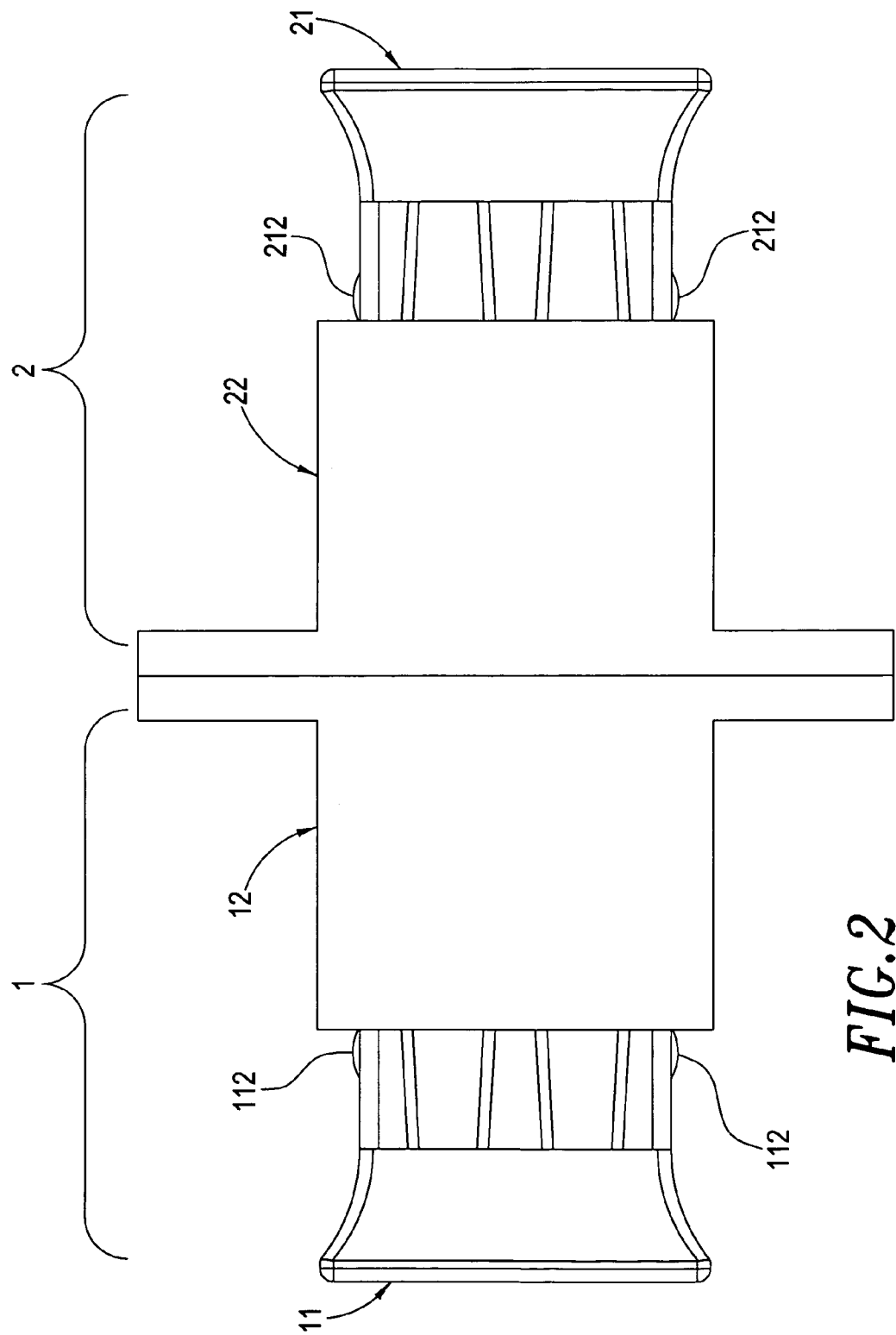
FIG. 2 illustrates a combinational view of a plastic fiber cable coupling structure.

Please refer to FIG. 1 and FIG. 2 for a perspective view and a combinational view of a plastic fiber cable coupling structure which mainly comprises a first coupling piece 1, a second coupling piece 2

The first coupling piece 1 comprises a male kit 11 and a female kit 12.

The male kit 11 has a fixing block 111 and a flange 112 disposed on each side thereof, and the male kit 11 has two cone-shaped fiber channels 113 disposed therein, with each one of the fiber channel 113 having a smaller inner diameter and a larger diameter for insertion of a plastic fiber cable 4. The male kit 11 is fastened to a detent body 1231, 1242 of the female kit 12 through the fiber channel 113.

The female kit 12 has a connecting hole 121 disposed on each side thereof, a fastening block 122 disposed on each inner side, and a first and a second fiber channel 123, 124 disposed therein, wherein the first fiber channel 123 has a plurality of detent bodies 1231 extended outwardly from the inner side thereof, a coupling hole 1232 dug out on the out side thereof, while the second fiber channel 124 has a guiding face 1241 formed on the inner side thereof and a plurality of detent bodies 1242 extended outwardly, and a coupling end 1243 extended outwardly from the outer side thereof, wherein a guiding face 1241 is also formed inside the coupling end 1243. The female kit 12 is provided for insertion of the male kit 11 and the female kit 12 has the fastening block 122 fastened with the fixing block 111 of the male kit 11, while the first and second fiber channel 123, 124 of the female kit 12 are disposed with respect to the fiber channel 113 of the male kit 11. The guiding face 1241 can guide the fiber of the plastic fiber cable to be precisely inserted into the fiber channel 123, 124 of the female kit 12.

The second coupling piece 2 comprises a male kit 21 and a female kit 22.

The male kit 21 having a fixing block 211 and a flange 212 disposed on each side thereof, and the male kit 21 has two cone-shaped fiber channels 213 disposed therein, with each one of the fiber channel 213 having a smaller inner diameter and a larger diameter for insertion of a plastic fiber cable 4. The male kit 21 is fastened to a detent body 2231, 2242 of the female kit 12 through the fiber channel 113.

The female kit 22 has a connecting hole 221 disposed on each side thereof, a fastening block 222 disposed on each inner side, and a first and a second fiber channel 223, 224 disposed therein, wherein the first fiber channel 223 has a plurality of detent bodies 2231 extended outwardly from the inner side thereof, a coupling hole 2232 dug out on the outer side thereof, while the second fiber channel 224 has a guiding face 2241 formed on the inner side thereof and a plurality of detent bodies 1242 extended outwardly, and a coupling end 2243 extended outwardly from the outer side thereof, wherein a guiding face 2241 is also formed in the coupling end 2243. The female kit 22 is provided for insertion of the male kit 21 and the female kit 22 has the fastening block 222 fastened with the fixing block 211 of the male kit 21, while the first and second fiber channel 223, 224 of the female kit 22 are disposed with respect to the fiber channel 213 of the male kit 21. The guiding face 2241 can guide the fiber of the plastic fiber cable to be precisely inserted into the fiber channel 223, 224 of the female kit 22.

Wherein the plastic fiber cable coupling structure is formed by connecting the first and the second coupling piece 1, 2 with the coupling end 1243 of the first coupling piece 1 inserting into the coupling hole 2232 of the second coupling piece 2, and the coupling end 2243 of the second coupling piece 2 inserting into the coupling hole 1232 of the coupling end 2243, then a locking piece 3 locking to connecting holes 121, 221 of the first coupling piece 1 and the second coupling piece 2 to combine the first and the second coupling piece 1, 2 into one unit, and the plastic fiber cable coupling structure is thus constituted.

Figure 3A:
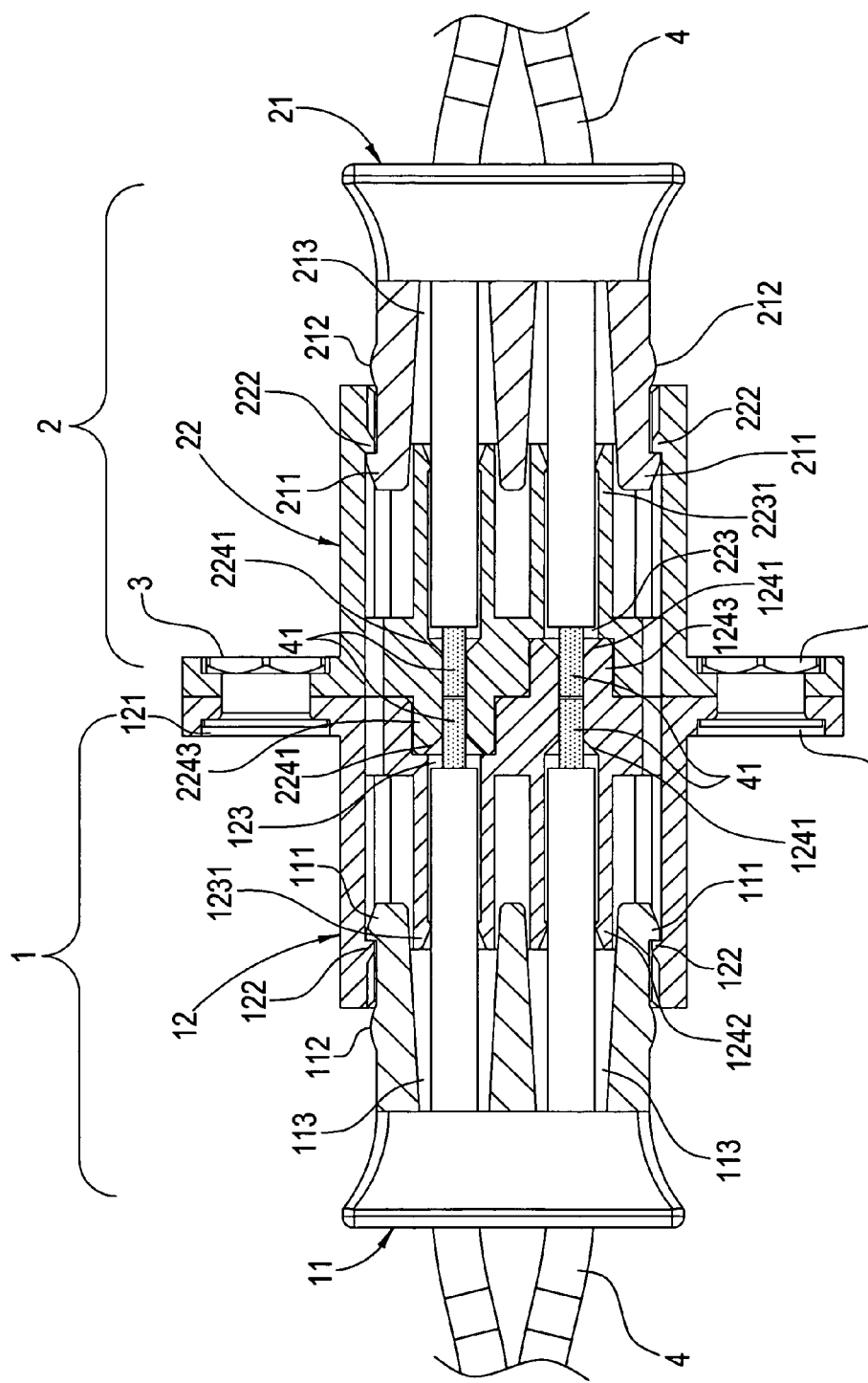
FIGS. 3A and 3B illustrate coupling embodiments of the plastic fiber cables coupling with each in the plastic fiber cable coupling structure.
Figure 3B:
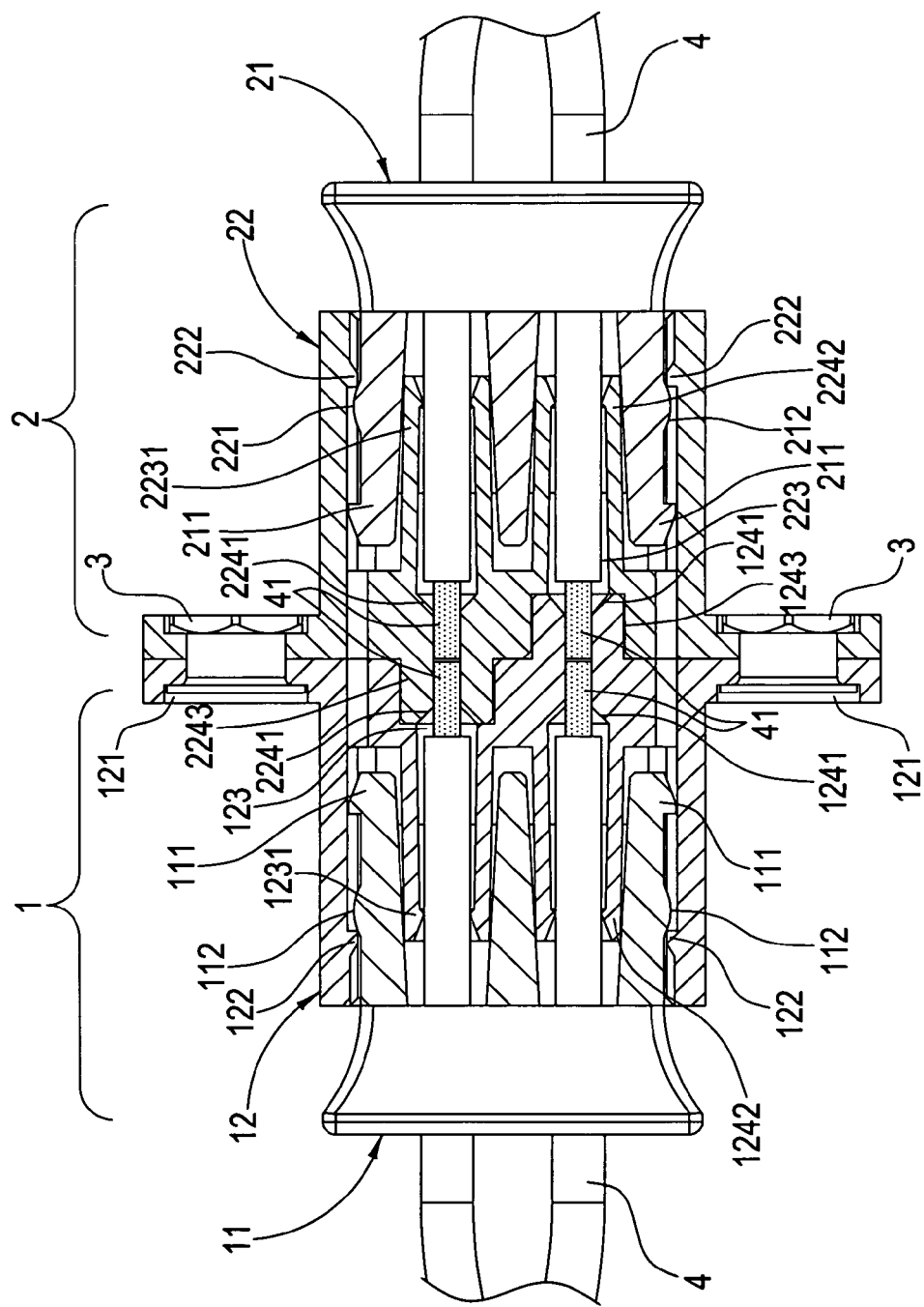

Please refer to FIGS. 3A and 3B, which illustrate coupling embodiments of the plastic fiber cables coupling with each in the plastic fiber cable coupling structure. As shown, the two plastic fiber cables 4 are inserted through the fiber channels 113, 213 of the male kit 11, 21 of the first coupling piece 1 and the second coupling piece 2 so as to let the fibers 41 of the two plastic fiber cables 4 couple with each other to avoid eccentric coupling. After the plastic fiber cables 4 are held in position, the male kit 11, 21 of the first coupling piece 1 and the second coupling piece 2 are simultaneously pushed towards the female kit 12, 22, at this time, due to the cone-shaped configurations of the fiber channels 113, 213 and the implementation of the flanges 112, 212, when the flange 112, 212 slide through the fastening block 122, 222, the fiber channels 113, 213 of the male kit 11, 21 will be pressed and the detent bodies 1231, 1242, 2231, and 2242 of the female kit 12, 22 will also be pressed at the same time to occlude the outer surface of the plastic fiber cables 4 to fix the plastic fiber cable 4, thus the plastic fiber cables 4 are kept in position.

Therefore, the embodiment of the present invention provides a plastic fiber cable coupling apparatus which is fast and easy to operate, and low in cost, while two plastic fiber cables 4 can be disposed in position and the fibers 41 of the plastic fiber cables 4 can be coupled with each other with high precision, therefore, the present invention is applicable in various plastic fiber cable 4 coupling applications.

The present invention provides a plastic fiber cable coupling structure, while compared to other traditional plastic fiber cable coupling structures, has the advantages as follow.

1. The present invention provides a coupling method for couple two plastic fiber cables into one fiber channel, this method facilitates easy and convenient installation and is not limited to specific environment or space during construction.

2. The present invention provides a plastic fiber cable coupling structure which is simple, easy to operate and inexpensive.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A plastic fiber cable coupling structure comprising:
a first coupling piece having a first male kit and a first female kit, the first male kit having a fixing block and a flange disposed on each side thereof, and the first male kit having a fiber channel disposed therein, the first male kit being fastened to a detent body of the first female kit through the fiber channel, the first female kit having a connecting hole disposed on each side thereof, a fastening block disposed on each inner side, and a first and a second fiber channel disposed therein, wherein the first fiber channel has at least one detent body extended outwardly from the inner side thereof, a coupling hole dug out on the out side thereof, while the second fiber channel has a guiding face formed on the inner side thereof and at least one detent body extended outwardly, and a coupling end extended outwardly from the outer side thereof, wherein a guiding face is also formed inside the coupling end, the first female kit being provided for insertion of the first male kit and the first female kit having the fastening block fastened with the fixing block of the first male kit, while the first and second fiber channel of the first female kit are disposed with respect to the fiber channel of the first male kit;
a second coupling piece the second coupling piece comprises a second male kit and a second female kit:
the second male kit having a fixing block and a flange disposed on each side thereof, and the second male kit having a fiber channel disposed therein, the second male kit being fastened to a detent body of the second female kit through the fiber channel;
the second female kit having a connecting hole disposed on each side thereof, a fastening block disposed on each inner side, and a third and a fourth fiber channel disposed therein, wherein the third fiber channel has at least one detent body extended outwardly from the inner side thereof, a coupling hole dug out on the out side thereof, while the fourth fiber channel has a guiding face formed on the inner side thereof and at least one detent body extended outwardly, and a coupling end extended outwardly from the outer side thereof, wherein a guiding face is also formed inside the coupling end; the second female kit being provided for insertion of the second male kit and the second female kit having the fastening block fastened with the fixing block of the second male kit, while the third and fourth fiber channel of the second female kit are disposed with respect to the fiber channel of the second male kit;
wherein the plastic fiber cable coupling structure is formed by connecting the first and the second coupling piece with the coupling end of the first coupling piece inserting into the coupling hole of the second coupling piece, and the coupling end of the second coupling piece inserting into the coupling hole of the coupling end and the plastic fiber cable coupling structure is thus constituted.

2. The plastic fiber cable coupling structure of claim 1, wherein each one of the fiber channels of the male kit has a smaller inner diameter and a larger outer diameter.

3. The plastic fiber cable coupling structure of claim 1, wherein the guiding faces guide the fiber of the plastic fiber cable to be precisely inserted into the fiber channels of the female kits.

4. The plastic fiber cable coupling structure of claim 1, wherein the first coupling piece and the second coupling piece couple with each other into one unit through a locking piece locking to connecting holes of the first coupling piece and the second coupling piece.

* * * * *